(No Model.) 4 Sheets—Sheet 2.
W. W. LOCKWOOD.
GRAIN ELEVATOR.
No. 542,418. Patented July 9, 1895.
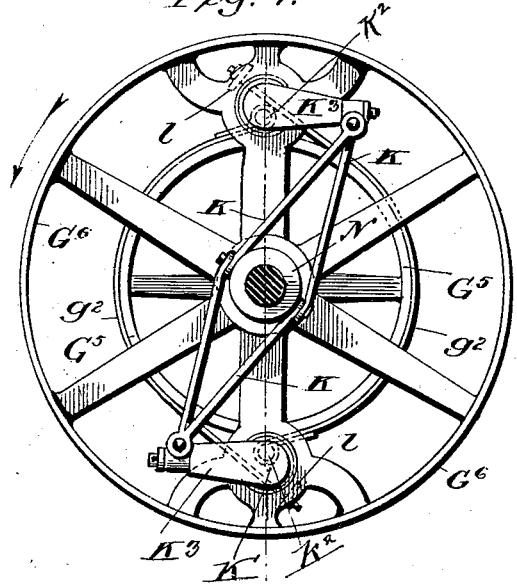
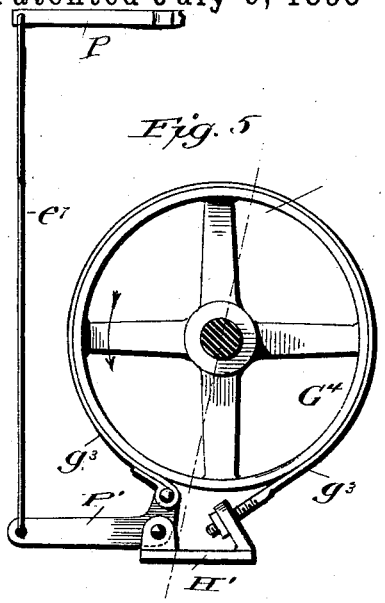
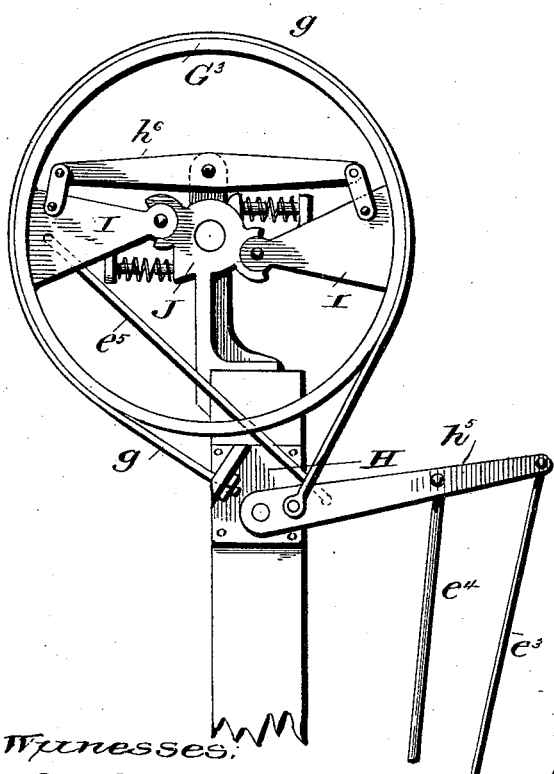
Witnesses:
L. C. Hills
A. L. Hough
Inventor:
William W. Lockwood
by Franklin H. Hough
Atty.

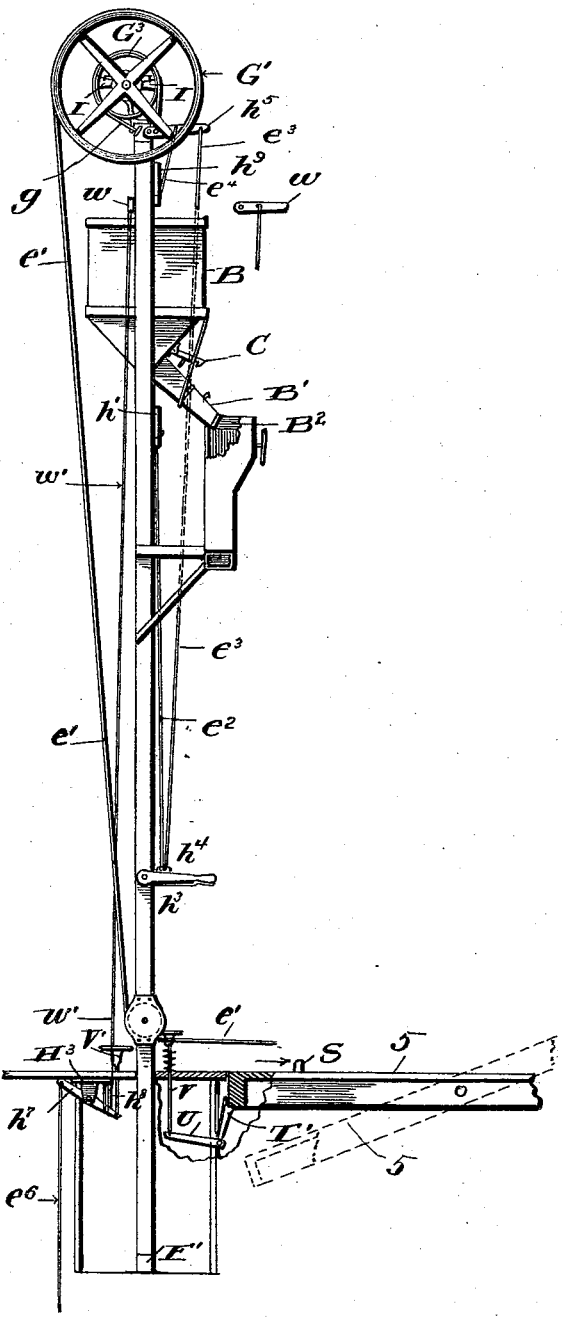

(No Model.) 4 Sheets—Sheet 3.
W. W. LOCKWOOD.
GRAIN ELEVATOR.
No. 542,418. Patented July 9, 1895.
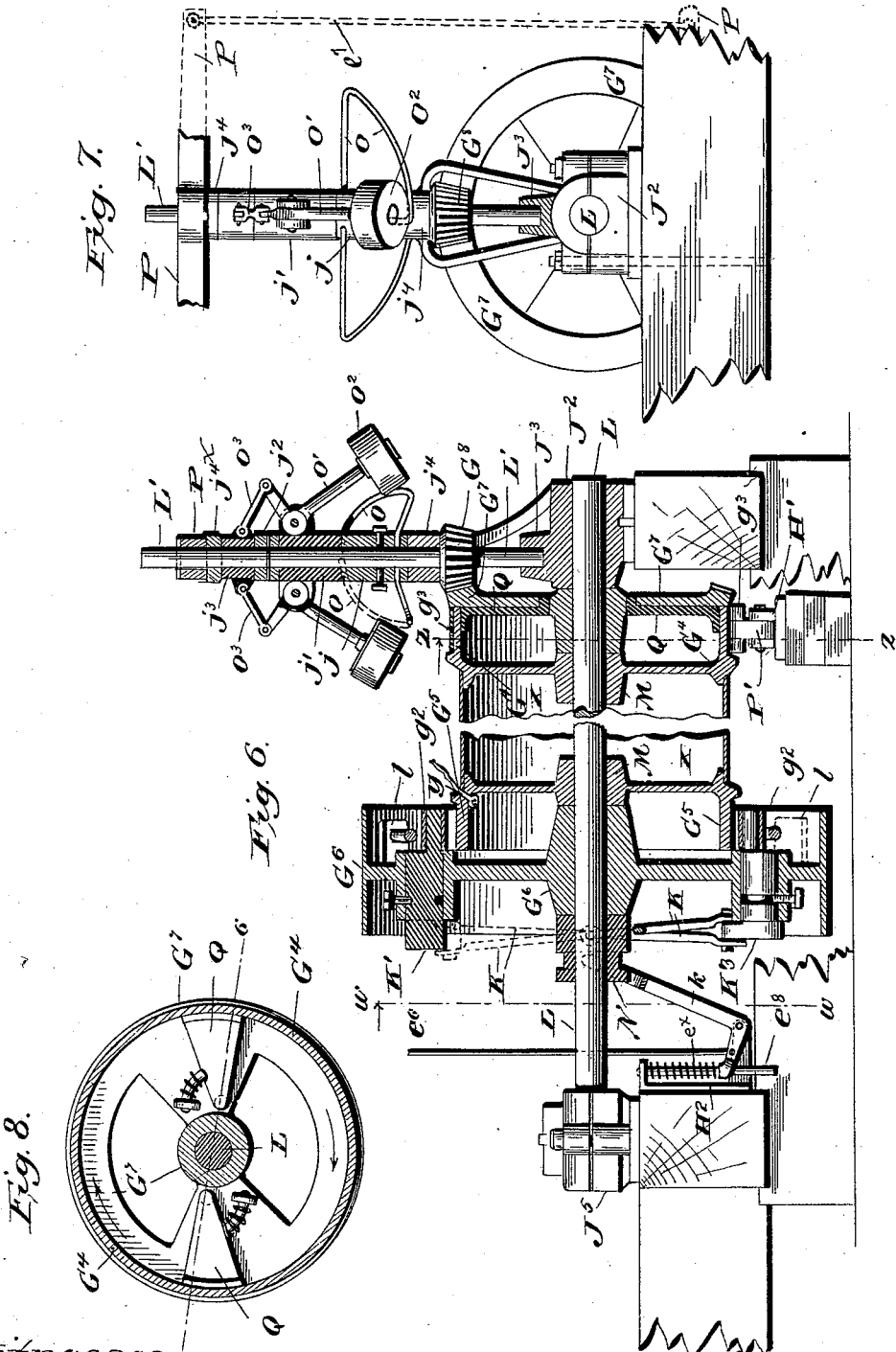
Witnesses:
L. C. Hills.
A. L. Hough
Inventor:
William W. Lockwood
by Franklin H. Hough
Atty.

(No Model.) 4 Sheets—Sheet 4.
W. W. LOCKWOOD.
GRAIN ELEVATOR.
No. 542,418. Patented July 9, 1895.
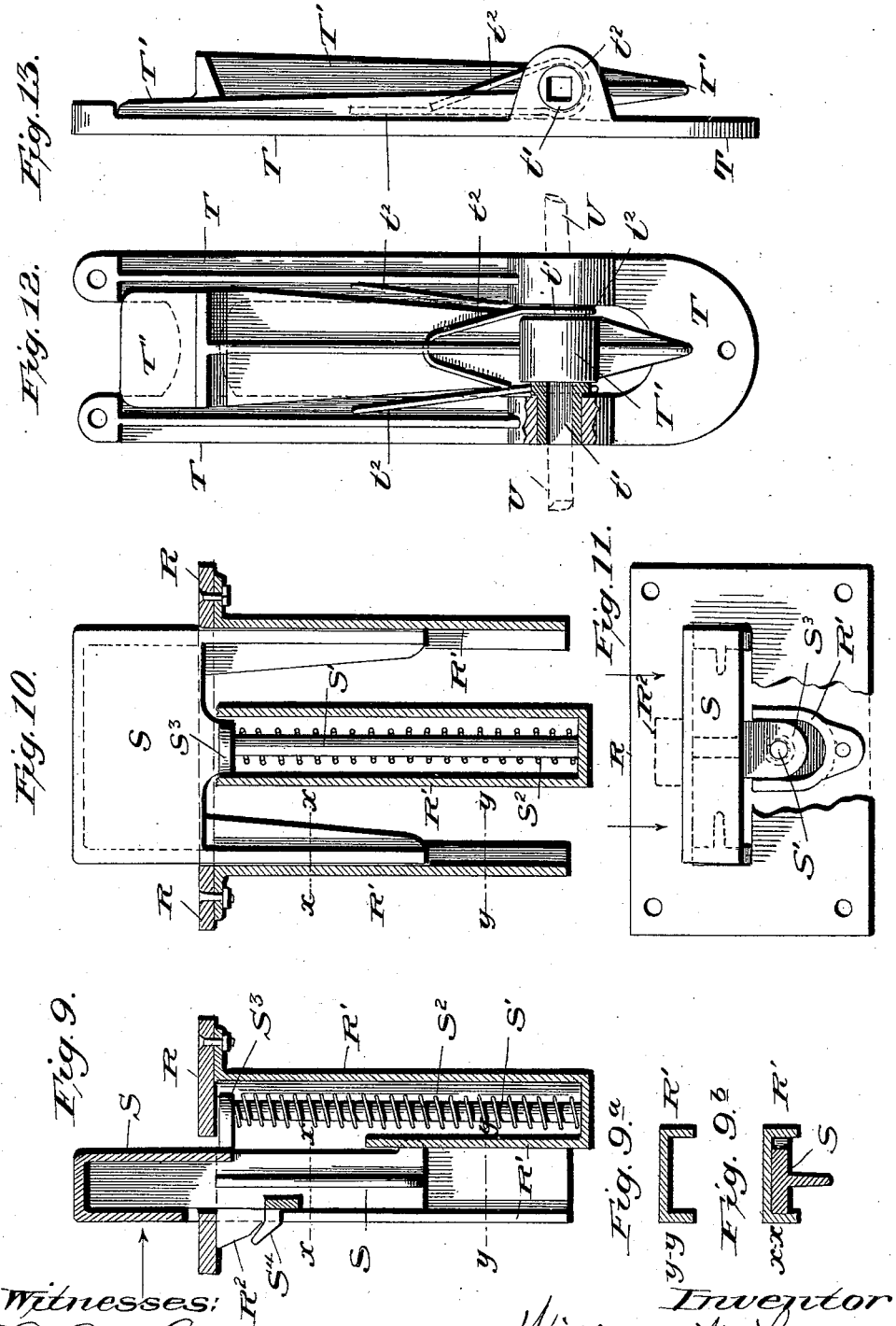
Witnesses:
L. C. Hills.
A. L. Hough.
Inventor
William W. Lockwood
by Franklin H. Hough
Atty.

UNITED STATES PATENT OFFICE.

WILLIAM W. LOCKWOOD, OF WINFIELD, KANSAS, ASSIGNOR TO THE LOCKWOOD SCALE AND ELEVATOR MANUFACTURING COMPANY, OF SAME PLACE.

GRAIN-ELEVATOR.

SPECIFICATION forming part of Letters Patent No. 542,418, dated July 9, 1895.

Application filed November 26, 1894. Serial No. 530,038. (No model.)

*To all whom it may concern:*

Be it known that I, WILLIAM W. LOCKWOOD, a citizen of the United States, residing at Winfield, in the county of Cowley and State of Kansas, have invented certain new and useful Improvements in Grain-Elevators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in elevators especially adapted for hoisting grain, and the aim of the invention is to produce an elevator in which a load of grain, after being dumped into its hopper from a wagon, may be hoisted to a given height, where it can be emptied and the descent of the hopper be automatically regulated as to speed by suitable governing mechanism which applies a friction-brake at regular intervals as the hopper is being lowered.

A further object of the invention resides in the peculiar construction of clutch-dogs which are adapted to engage with the inner periphery of a rim carried by a winding-drum in its backward revolutions, but not to engage with the said periphery in the opposite revolution of the drum.

A still further feature of my invention resides in the mechanism for blocking the wheel of a vehicle while the wagon-load of grain or other material is being dumped. The construction of the same in detail will be hereinafter more fully described.

To these ends and to such others as the invention may pertain the same consists, further, in the novel construction, combination, and adaptation of the parts, as will be hereinafter more fully described, and then specifically defined in the appended claims.

I clearly illustrate my invention in the accompanying drawings, which, with the letters of reference marked thereon, form a part of this specification, and in which drawings—

Figure 1 is a side elevation of my elevator-shafts, hopper, and winding-drum. Fig. 2 is a front view of the same. Fig. 3 is a detail view of the clutch-dogs and friction-rim engaged thereby; Fig. 4, a detail view of the frictional clutching device in connection with hoisting-drum shaft. Fig. 5 is a detail view of a friction-wheel at one end of the hoisting-drum engaged by an automatically-operated friction-band. Fig. 6 is a sectional view of the hoisting-drum and governing mechanism. Fig. 7 is a detail view of the governing mechanism. Fig. 8 is a detail view of the clutch-dogs on rim $G^4$. Fig. 9 is a vertical section of the wagon-blocking device. Figs. $9^a$ and $9^b$ are cross-sections on the lines $y\ y$ and $x\ x$ of Fig. 9. Fig. 10 is a front vertical sectional view of the wagon-blocking device. Fig. 11 is a top plan view of the same; Fig. 12, a bottom plan view of the latch for holding the tilting platform, and Fig. 13 a side view of the same.

Reference now being had to the details of the drawings by letter, B designates the hopper of an elevator having suitable folding-spout B' and trip-rod $C^4$ connected thereto by means of an angle-lever and rod $C^3$, the said hopper being supported in a suitable framework to which sheaves are attached, over which winding-ropes $e$ run, each having an end connected to the cross-piece F of the upright posts of the elevator-frame and their other ends, after passing around the said sheaves, are secured to a winding-drum G, there being one at each end of a shaft mounted on the upper side of the said cross-piece F.

G' is a winding-drum keyed to the said shaft, and to the spokes of the said winding-drum G' is attached the clutch-rim $G^3$, around which passes a steel-band $g$, fastened at one end to a casting H, its other end to a lever $h^5$.

To a cast-journal J are fitted two friction-clutch dogs I, eccentrically journaled and designed to bear against the rim $G^3$ on its inner periphery by means of suitable springs bearing against portions of the journal-boxes and lugs carried by or integral with the said dogs. These dogs engage the rim $G^3$ to prevent backward rotation of the same, but allow of such a rotation in the direction as would raise the hopper. Attached to the lug on the journal J is the lever $h^6$, the ends of which are attached to the dogs I by means of links, as shown.

Referring to Fig. 6, mounted on a suitable frame are the journal-boxes $J^2$ and $J^5$, carrying the shaft L. Keyed to this shaft is the driving-pulley $G^6$, and fitted loosely to the shaft are the winding-drum heads $G^4$ and $G^5$, carrying the cylindrical drum X suitably secured thereto. The bevel-geared wheel $G^7$ and the slip-collar N are loosely mounted on the said shaft L. The stub-shafts K' are journaled in the arms of the pulley $G^6$, these stub-shafts carrying at one end the eccentric-pins $k^2$, to which one end of the steel straps $g^2$ are attached, the other ends of the straps terminating in round shanks and passing through lugs $l$ on the pulley $G^6$ diametrically opposite the shafts $k'$, the shanks being screw-threaded and provided with nuts for tightening the straps. Keyed to the other end of the stub-shafts are crank-arms $K^3$, these arms being connected to the sliding collar N by the rods K, so that when the collar N is moved along the shaft L the stub-shafts are rotated, causing the strap $g^2$ to grip or release the rim $G^5$ of the winding-drum. To the timbers below the shaft L is fastened the casting $H^2$, which carries the lever $k$, said lever having its upper end forked in a well-known manner, the forked arms entering the annular recess on the collar N, the free end of said lever having a perforation through which a rod $e^8$ passes, and around this rod is provided the spring $e^x$, arranged to draw said collar N to the left and loosen the steel band $g^2$. To this lever also is fastened the rod $e^6$, which extends upward and attaches to a lever $h^7$.

The L-shaped collar $h^8$ is provided to hold the lever $h^7$ in such a position that the rod $e^6$, which is fastened thereto, will cause the sliding collar N, through the medium of the lever $k$, to crowd against the driving-wheel $G^6$ and tighten the friction-band $g^2$ about the rim $G^5$ and to release the lever $h^7$ when the hopper reaches a given height by the hopper's tripping a lever $w$, having connection through the rod $w'$ with said lever $h^8$, which latter holds the lever $h^7$ in such a relation as to cause the friction-bands to grip the rim of the rim $G^5$ until released by the above-mentioned tripping mechanism.

Cast solid with the box $j^2$ is the box $j^3$ and box $j^4$, in which is journaled the shaft L', which carries the beveled pinion $G^8$, and the said pinion is adapted to mesh with the beveled geared wheel $G^7$. Immediately above the box $j^4$ to the shaft L' is securely fastened the casting $j$, which carries two or four spiral tracks O, and just above the casting $j$ is the collar $j'$, which is free to turn on the shaft, being held in position by the collar $j^2$. Next above the collar $j^2$ is the collar $j^3$ and the washer $j^{4\times}$.

Suitable ears on the collar $j$ carry ball-crank levers O', which carry balls $O^2$ on their long arm, and the short arms are connected by links $o^3$ to the collar $j^3$, said balls being free to turn on said levers O'.

The special advantage of providing the spiral tracks O, as described, is to throw the revolving wheels out, causing an intermittent brake as the wheels $o^2$ come in contact with the series of inclined tracks, which result could not be obtained if the said wheels or balls $o^2$ were thrown out by centrifugal force. The shaft L' would not make rapid enough revolutions to cause the brake to be applied by centrifugal force.

Resting on the washer $j^{4\times}$ is the center of lever P, which is made of two bars of iron bent so as to encircle the shaft L', as shown. One end of the said lever is held down by means of a rod secured to a suitable timber. The other end is connected to the lever P' by the rod $e^7$. The short end of the lever P' is attached to one end of the steel strap $g^3$, as shown, said strap passing around the rim $G^4$ and terminating in a round shank and provided with suitable means for tightening same is fastened to the lug H', said casting H' being bolted to a cross-timber beneath the rim $G^4$.

On the back side of the gear-wheel $G^7$ are two friction-dogs Q, pivoted to said wheel by their inner ends, and said dogs are pressed outward by the springs, as shown, and made to engage with the inner periphery of the clutch-rim $G^4$. They are eccentrically pivoted, so that they will grip the rim while the same is turning in only one direction. The rim $G^4$ is adapted to be engaged on its inner periphery by the dogs Q when the drum starts backward, causing the geared wheel to turn the shaft L', and the outer periphery of the said rim is designed to be frictionally engaged by the strap $g^3$ to the brake-drum.

Referring now to the wagon-blocking mechanism, R is a top-plate casting carrying the lug $R^2$, and R' is a casting having two slotted prongs and one half-round prong extending downward, as shown in the drawings.

S is the wheel-block casting also having two prongs extending loosely into the grooves of the prongs R'. S also carries the lug $S^3$, through which passes loosely the rod S', and around this rod is a coiled spring $S^2$, which presses against the lug $S^3$ and raises the cast block S to the position shown in Figs. 9 and 10. Casting S also carries the lug $S^4$. The casting S is held in its vertical position from the vertical portion of the substantially L-shaped casting. Casting S also carries the lug $S^4$, which comes in contact with the lug $R^2$ and causes the casting S to hook onto the plate-casting R. The wagon-wheel striking it from the direction of the arrow, Figs. 9 and 11, will push the casting forward and push it down, the spring $S^2$ yielding; but it immediately returns to place as soon as the wheel is over and will not give away to pressure from the opposite direction. By this provision the wheel of the wagon, after passing over the lug or projecting portion S, is blocked and prevented from backing down the inclined platform when it tilts to dump the load of grain or other material. The portion S is prevented from being depressed into the slot when the wheel backs against the said projection S by the depending edge thereof coming into contact with the top of the plate R, but when the wheel strikes the portion S from the opposite direction the said projecting portion is crowded slightly laterally, so that the depending edge will free the edge of the plate R and will be depressed, allowing the wheel to pass over it. The rod S' serves as a guide for the portion S, and carries the coiled spring $S^2$, which supports the said portion.

In Figs. 12 and 13 are shown enlarged detail views of the locks for supporting the tilting platform, T being the main casting, having the two shoulders integral therewith, which carry the square rod U in suitable boxes, and T' is a dog having a square perforation and is journaled on the said square rod, as seen in Fig. 12. The dog T' is pressed out by means of the springs $t^2$, which pass through the center flanges or ridges of the said dog, and the ends pass around the flange and journal $t'$ and rest against the main casting. The rod U bends at right angles at one end and is attached to the foot lever V, Fig. 1.

The operation of the elevating device is as follows: The load of grain or other material to be elevated is first dumped into the hopper. The operator then presses on the lever V' and through its connection with the sliding collar N the hoisting-drum is caused to be frictionally engaged with the driving-wheel and the hopper caused to be raised to a given height, where it may be dumped. When the hopper comes in contact with the trip-lever $w$ the frictional bands of the driving-wheel are released from the hoisting-drum through the medium of the rod $w'$, lever $h^7$, rod $e^6$, lever $k$, and collar N. As the hopper lowers the governor mechanism is caused to operate by the spiral tracks being set in motion and the lever P to apply a regular intermittent brake to the friction-band $g^8$, causing the hoisting-drum to be checked in its backward revolution. The trip-lever $h^9$ on the elevator-shafts, when the elevator-hopper is at its highest limit, is tilted as the hopper-frame strikes it, and through its connection with $e^4$, the clutch-dogs I are released from contact with the rim $G^3$, allowing the latter to turn backward.

Having thus described my invention, what I claim to be new, and desire to secure by Letters Patent, is—

1. In an elevator, the combination with the hoisting drum, means for driving the same, the spiral tracks, means whereby said tracks are driven by the backward rotation of said drum, a brake adapted to arrest the rotation of said drum, and means whereby said brake is applied by the rotation of the said tracks, substantially as shown and described.

2. In an elevator, the combination with the hoisting drum, means for driving the same, the beveled geared wheel $G^7$, the clutch-dogs Q carried by said wheel and adapted to clutch the same to the horizontal drum in the backward rotation of said drum, the spiral tracks driven from said wheel $G^7$, the governing mechanism operated by said tracks and means to arrest the backward movement of said hoisting drum operated by said governing mechanism, substantially as shown and described.

3. In an elevator the combination with the hoisting drum means for driving the same, the bevel geared wheel $G^7$, the clutch dogs Q carried by said wheel and adapted to clutch the same to the hoisting drum in the backward rotation of the said drum, the spiral tracks driven from said wheel $G^7$, the governing mechanism operated by said tracks, the lever P operated by said governing mechanism and designed to actuate mechanism to arrest the backward motion of the said hoisting drum, substantially as shown and described.

4. In an elevator the combination with the hoisting drum means for driving the same, the bevel geared wheel $G^7$, means for clutching the hoisting drum in the backward rotation of said drum, a vertical shaft L', carrying a bevel wheel designed to mesh with teeth on the said wheel $G^7$, a casting $j$ keyed to said shaft, and carrying a plurality of spirally inclined tracks, governing mechanism actuated by said tracks, braking mechanism for arresting the backward revolution of said hoisting drum at regular intervals, operated by said governing mechanism, substantially as shown and described.

5. The casting R combined with the vertical guides R', the top plate R and the spring casing $R^4$, the block slidable in said guides, and adapted to be depressed by contact with a vehicle wheel when moving in one direction, and to be thrown against the top plate by contact with the wheel in the other direction, so as to prevent it being depressed, a spring held in the casing $R^4$ to elevate said block when depressed, and means to prevent displacement of said block by said spring, substantially as shown and described.

6. In combination with a tilting platform, means to scotch the wheels of a vehicle on said platform, said means comprising the casting R, secured to the said platform, a block vertically slidable in said casting and adapted to be depressed by contact with the wheel of said vehicle when driven on said platform, and to be prevented from being depressed when said wheel comes in contact therewith, when said wheel is backed on said platform, and a spring to actuate said block, substantially as shown and described.

7. In combination with a tilting platform of an elevator, the casting S having prongs as described and mounted on a vertical post S', the spring $S^2$, the integral lug $S^4$ bearing against the integral lug $R^2$ on the casting R, the said projecting portion S adapted to be depressed only when pressure is applied from the side carrying the lug $R^2$, substantially as shown and described.

8. In combination a casting J held to the top of an upright post, a winding drum shaft mounted in said casting, the clutch dogs I pivoted to integral projections of said casting, the rim $G^3$ and springs for holding said clutch dogs against the inner periphery of said rim, and means for supporting the free ends of said dogs and for releasing one of the said dogs, substantially as shown and described.

9. In combination, a casting J, held to an upright post a winding drum shaft mounted in said casting, the clutch dogs I pivoted to integral portions of said casting, the bar $h^6$ pivoted near its longitudinal center to an upwardly extending portion of said casting and having link connection with the free ends of said dogs I, the winding drum $G'$ and rim $G^3$ secured thereto and means for releasing one of the said dogs, substantially as shown and described.

In testimony whereof I affix my signature in presence of two witnesses.

WILLIAM W. LOCKWOOD.

Witnesses:
 T. B. MYERS,
 PHILIP SIPE.